United States Patent Office 2,715,135
Patented Aug. 9, 1955

2,715,135

REACTION PRODUCTS OF GLYCOLS AND VINYL TRICHLOROSILANE

Marvin C. Brooks, Packanack Lake, and Roswell H. Ewart, Bloomfield, N. J., assignors to United States Rubber Company, New York, N. Y., a corporation of New Jersey No Drawing. Application November 8, 1951,
Serial No. 255,534

5 Claims. (Cl. 260—448.8)

This invention relates to the reaction products of vinyltrichlorosilane with aliphatic dihydric alcohols.

We have found that vinyltrichlorosilane can be caused to react with aliphatic dihydric alcohols to give reaction products which are valuable new chemicals having a unique combination of chemical and physical properties. Upon hydrolysis, these reaction products form silicone resins; if the hydrolysis is carried out while the reaction products are in contact with a hydrated surface, they form silicone films bound to the surface.

The principal object of the present invention is to convert vinyltrichlorosilane to a derivative which lacks certain disadvantages attendant upon the use of this compound itself.

Because of the high vapor pressure of vinyltrichlorosilane, it is difficult to handle. It is also very corrosive and therefore difficult to package and relatively dangerous to ship. The reaction products of the present invention do not suffer from these disadvantages.

A further disadvantage in the use of vinyltrichlorosilane is confronted during the hydrolysis of this compound. When it is hydrolyzed, hydrogen chloride is evolved. This creates a health and corrosion hazard. Moreover, the hydrogen chloride frequently acts as a catalyst for undesirable side reactions during the hydrolysis. By the use of the reaction products of the present invention these difficulties are avoided.

Another object is to make available new materials which are particularly adapted for incorporation in rubber mixtures containing silica and silicate fillers, and which lend themselves to incorporation by ordinary rubber compounding techniques, using ordinary rubber processing equipment. These new materials cause unique improvement of the reinforcing properties of the silica and silicate fillers in certain synthetic rubbers. Another object is to convert the high vapor pressure vinyltrichlorosilane, into low vapor pressure materials which are easily handled and which react with the rubber filler similarly to the vinyltrichlorosilane. Numerous other advantages of our invention will more fully appear.

We have discovered that the aliphatic dihydric alcohols will react with vinyltrichlorosilane to give valuable chemicals which are unique with respect to their ability to enhance the reinforcing properties of silica and silicate fillers in certain synthetic elastomers, namely those containing at least 25% by weight of combined aliphatic conjugated diolefin. According to our invention the aliphatic dihydric alcohols and the vinyl silane are reacted in such proportions that the mole ratio of alcoholic hydroxyl to chlorine atoms in the reactants is greater than 1:1 but preferably does not exceed 2:1. By the use of such a ratio we are enabled to obtain an ungelled reaction product, and in most cases to obtain a reaction product which is a free-flowing liquid.

We have further found that if the mole ratio of alcoholic hydroxyl groups to chlorine atoms in the reactants is greater than 1.3:1, the reaction product itself, in the absence of a solvent therefor, is a free-flowing liquid and therefore is eminently adapted to be directly incorporated in rubber-and-filler mixtures by the ordinary rubber compounding techniques.

It was very surprising to find that aliphatic dihydric alcohol-vinyltrichlorosilane reaction products prepared according to our invention were soluble, ungelled materials. On the basis of accepted theories of condensation polymerization, as set forth, for example, by Flory, J. A. C. S., volume 63, page 3083 (1942), one skilled in the art would predict that the condensation of a difunctional alcohol and a trifunctional acid such as a trichlorosilane, would give a gelled product when the mole ratio of alcoholic hydroxyl groups to equivalents of acid, viz., the chlorine atoms supplied by the trichlorosilane, is not over 2:1. We have actually found, however, that the reaction products of our invention are free-flowing liquids when the mole ratio of alcoholic hydroxyl to chlorine is between 1.3:1 and 2:1, and that the reaction products are ungelled, soluble materials when the ratio is between 1:1 and 1.3:1, it being possible when using ratios between 1:1 and 1.3:1 to obtain a free-flowing liquid material by carrying out the reaction in the presence of a suitable proportion of an inert organic solvent. We prefer to use a solvent having a boiling point above 100° C., e. g., toluene or xylene, or a still higher boiling solvent, particularly one of those hydrocarbons which boil above 200° C. and are plasticizers for rubber.

The reaction between the dihydric alcohol and the vinyltrichlorosilane is effected by merely commingling the two reactants under such conditions that they react with the liberation of hydrogen chloride, the hydrogen of the hydrogen chloride coming from the alcoholic hydroxyl groups and the chlorine coming from the vinyltrichlorosilane. Provision should be made for removal of the hydrogen chloride as it is formed. This is most conveniently done by removing the hydrogen chloride as a gas from the reaction zone in ways well-known to those skilled in the art.

Alternatively, we can effect the reaction in the presence of a suitable hydrogen chloride acceptor or binder, usually an alkaline-reacting material, e. g., an alkaline earth carbonate, which neutralizes the hydrogen chloride immediately upon its formation, thereby forcing the reaction towards completion.

Typically, we use a reactor provided with stirring means, means for heating, means for refluxing and a trap for removing the hydrogen chloride vapor. We charge the dihydric alcohol to this reactor and then gradually add the vinyltrichlorosilane thereto with agitation and with refluxing of the evolved vapors and continuous removal of the hydrogen chloride from the system. The reaction is initiated spontaneously with evolution of heat and hydrogen chloride. When addition of the vinyltrichlorosilane is complete, we heat the reaction mixture to an elevated temperature, e. g., 200° C. to complete the reaction. Completion of the reaction is attained when all of the chlorine in the vinyltrichlorosilane has been converted to hydrogen chloride. The reaction product is then ready for use.

It is not essential that an organic solvent for the vinyltrichlorosilane be present during the reaction, although such a solvent can be used in conducting any of the reactions of our invention. In the case of those reaction mixtures wherein the hydroxyl:chlorine ratio is between 1:1 and 1.3:1, we much prefer that an inert organic solvent having a boiling point greater than 100° C. be present during the reaction, in order that the reaction product will be a free-flowing liquid. The solvent used should dissolve vinyltrichlorosilane and should also be a solvent for the reaction products but it is not essential that it dissolve the dihydric alcohol since a dispersion of the dihydric alcohol in the solvent can be employed. This aspect of our invention is more fully described hereinafter.

The reaction is carried out at an elevated temperature which can range from 50° to 250° C. but commonly ranges from 150° to 225° C. Since the dihydric alcohol and the vinyltrichlorosilane react together exothermically while they are being commingled, a considerable portion of the reaction occurs during the period of intermixing. When a solvent is employed we carry out the balance of the reaction at the refluxing temperature of the mixture, at atmospheric pressure.

Throughout the reaction we prefer to agitate the reaction mixture and to condense and return thereto the readily condensible portion of the vapors evolved, by means of conventional refluxing equipment, while removing the uncondensed portion of the vapors from the system. This uncondensed portion is mainly hydrogen chloride, which, if desired, can be contacted with an alkaline material to neutralize it and simplify its disposal.

To recapitulate, in order to obtain free-flowing liquid reaction products, i. e., reaction products which intrinsically and without the presence of a solvent are free-flowing liquids, it is essential to use relative proportions of dihydric alcohol and vinyl trichlorosilane such that the mole ratio of alcoholic hydroxyl to chlorine atoms is greater than 1.3:1. This ratio can range upwardly to as high as 2:1. In general, a ratio greater than 2:1 should not be used because the excess of dihydric alcohol above the 2:1 ratio does not combine chemically and serves merely to dilute the reaction product. Because dihydric alcohol is an expensive diluent, we much prefer to employ equivalent ratios not greater than 2:1.

As previously indicated, we can, although less preferably, employ the reactants in such proportions that the mole ratio of alcoholic hydroxyl to chlorine atoms is between 1:1 and 1.3:1. In this case commercially usable materials can be made provided that the reaction is carried out in the presence of a solvent capable of dissolving both the vinyltrichlorosilane and the reaction products. If the reaction is carried out at such ratios in the absence of a solvent for the vinyltrichlorosilane and for the reaction products, the mixture of reaction products is extremely viscous, in fact so viscous that it is not feasible for commercial use. In addition, the evolution of the hydrogen chloride gas during the reaction causes excessive foaming because of the high viscosity and foam retentiveness of the reaction mixture. Moreover, the problem of securing adequate heat transfer to the interior of the body of the reaction mixture obtained at such equivalent ratios is extremely serious and precludes use of such ratios on a commercial scale.

In order to obtain a commercially usable material with the mole ratio of alcoholic hydroxyl groups to chlorine atoms being between 1:1 and 1.3:1, we can use any inert organic solvent but we prefer to employ a solvent having a boiling point greater than 100° C. so as to enable a suitable elevated reflux temperature. We can conveniently use hydrocarbons, e. g., toluene or xylene. We especially prefer to use high boiling hydrocarbon solvents (boiling above 200° C.) which are plasticizers for rubber; examples of these are the conventional coal tar softeners and the medium viscosity petroleum fractions commonly used for softening rubber. The reaction can be carried out in the presence of such rubber plasticizers or it can be carried out in a lower-boiling solvent, typified by toluene or xylene, which is subsequently replaced with such hydrocarbon plasticizers for rubber.

We can use any aliphatic dihydric alcohol in practicing our invention. The dihydric alcohol is almost invariably saturated. Examples of saturated aliphatic dihydric alcohols which we may use are glycols such as ethylene glycol, propylene glycol, trimethylene glycol, any of the butylene glycols, etc., and the polyglycols, which contain ether oxygen between carbon atoms in the chain, e. g., diethylene glycol, triethylene glycol, dipropylene glycol, etc.

The reaction products of our invention are valuable materials for compounding with certain synthetic rubbers containing silica or silicate fillers. The reaction products of our invention can be added to such rubber and filler mixtures on an ordinary rubber mill and caused to react with the filler to effect surface treatment thereof in such a way as to greatly improve the physical properties of the resulting vulcanizates.

The following examples illustrate the present invention:

Example 1

The reaction is carried out in a three-neck flask, provision being made for stirring, refluxing, and the dropwise addition of the vinyltrichlorosilane. A trap is provided to remove the hydrogen chloride formed during the reaction period. One hundred and eight grams of vinyltrichlorosilane are added dropwise to 114 g. of propylene glycol with continuous stirring of the mixture. The reaction commences almost immediately and is accompanied by the evolution of heat and hydrogen chloride. After the addition of the vinyltrichlorosilane is completed, the reaction mixture is heated at 200° C. and kept at this temperature until evolution of hydrogen chloride ceases. The reaction product is a colorless liquid weighing 151 g. The theoretical yield, assuming complete esterification of all the vinyltrichlorosilane, is 149 g. The weights thus indicate that the reaction has gone substantially to completion.

Example 2

In an apparatus similar to that of Example 1, 250 g. of vinyltrichlorosilane is added to 375 g. of diethylene glycol. The reaction mixture is heated at 200° C. until evolution of hydrogen chloride vapor ceases. The product is a light brown liquid weighing 458 g. Since the theoretical yield is 453 g., it is evident that the reaction has gone substantially to completion.

Example 3

In an apparatus similar to that of Example 1, 108 g. of vinyltrichlorosilane is added to 334 g. of 2-ethylhexanediol-1,3, and the heating carried on as before. A slightly yellow liquid product is obtained which weighs 374 g.

Example 4

Reaction products of vinyltrichlorosilane and propylene glycol are made up using different ratios of vinyltrichlorosilane and propylene glycol. The method is similar to that of Example 1. Viscosities of the products thereby obtained, as measured by a Brookfield viscometer, are given below.

| Weight of propylene glycol | Weight of vinyltrichlorosilane, g. | Mol ratio of alcoholic hydroxyl groups to chlorine atoms | Viscosity of reaction product at 25° C. (in centipoises) |
| --- | --- | --- | --- |
| 114 g | 81 | 2.0:1.0 | 112 |
| 114 g | 101 | 1.6:1.0 | 240 |
| 114 g | 108 | 1.5:1.0 | 440 |
| 114 g | 113 | 1.42:1.0 | 1,160 |
| 114 g | 119 | 1.35:1.0 | 12,000 |
| 114 g | 124 | 1.30:1.0 | 86,000 |

It is apparent from these data that the mole ratio of alcoholic hydroxyl groups to chlorine atoms in the reaction mixture controls the viscosity of the product, and that free-flowing liquid products are obtained only when the ratio of hydroxyl groups to chlorine atoms is greater than 1.3.

Example 5

This experiment illustrates the difficulties encountered in preparing the reaction products of the present invention when the mole ratio of alcoholic hydroxyl groups to chlorine atoms is below 1.3:1, and the alleviation of these difficulties by the use of an organic solvent.

In an apparatus similar to that of Example 1 a reaction mixture is prepared which consists of 106 g. diethylene glycol and 102 g. vinyltrichlorosilane, the ratio of hydroxyl groups to chlorine atoms being 1.05:1. Even before all of the vinyltrichlorosilane has been added, the reaction mixture becomes very viscous; the viscous mixture foams to such an extent that it is difficult to contain it in the reactor.

An amount of xylene equal in volume to that of the reaction mixture is then added to the reaction mixture and a solution of low viscosity is thereby rapidly obtained. This solution is refluxed for about an hour to complete the reaction. The reaction product is a light brown solution of low viscosity.

The vinyltrichlorosilane-dihydric alcohol reaction products of our invention are especially adapted for use with rubber-and-filler mixtures wherein the rubber is either a butadiene-styrene rubbery copolymer (so-called GR–S) or a butadiene-acrylonitrile rubbery copolymer (known as GR–A) or similar synthetic rubbery copolymer containing at least 25% of combined butadiene. Details as to the use of our reaction products in such rubber-and-filler mixtures can be found in our copending application Serial No. 250,788 filed October 10, 1951.

From the foregoing description, many advantages of the present invention will be apparent to those skilled in the art. The principal advantage is that the invention makes available to the art new reaction products of vinyltrichlorosilane with aliphatic dihydric alcohols, the reaction products being valuable chemical materials, being particularly valuable as rubber compounding ingredients for use in conjunction with certain synthetic elastomers containing silica and silicate fillers. By reacting the vinyltrichlorosilane with the aliphatic dihydric alcohols, we produce materials which exhibit low volatility, which are free from corrosive tendencies and which may readily be shipped, handled and used without the disadvantages attending vinyltrichlorosilane itself. Our invention presents the advantage that the chlorine contained in the vinyltrichlorosilane is removed in a separate reaction, yet the reaction products produced are capable of reacting with the rubber filler in much the same way as vinyltrichlorosilane itself. Numerous other advantages of the present invention will be apparent to those skilled in the art.

Having thus described our invention, what we claim and desire to protect by Letters Patent is:

1. The product formed by the reaction of an aliphatic dihydric alcohol with vinyltrichlorosilane with the liberation of hydrogen chloride, the mole ratio of alcoholic hydroxyl groups furnished by said alcohol to chlorine atoms furnished by said vinyltrichlorosilane being greater than 1.3:1, said product being a free-flowing liquid at ambient temperatures.

2. The product formed by the reaction of diethylene glycol with vinyltrichlorosilane with the liberation of hydrogen chloride, the mole ratio of alcoholic hydroxyl groups furnished by said glycol to chlorine atoms furnished by said vinyltrichlorosilane being greater than 1.3:1, said product being a free-flowing liquid at ambient temperatures.

3. The product formed by the reaction of propylene glycol with vinyltrichlorosilane with the liberation of hydrogen chloride, the mole ratio of alcoholic hydroxyl groups furnished by said glycol to chlorine atoms furnished by said vinyltrichlorosilane being greater than 1.3:1, said product being a free-flowing liquid at ambient temperatures.

4. The product formed by the reaction of ethylene glycol and vinyltrichlorosilane with the liberation of hydrogen chloride, the mole ratio of alcoholic hydroxyl groups furnished by said glycol to chlorine atoms furnished by said vinyltrichlorosilane being greater than 1.3:1, said product being a free-flowing liquid at ambient temperatures.

5. The product formed by the reaction of an aliphatic dihydric alcohol and vinyltrichlorosilane with the liberation of hydrogen chloride, the mole ratio of alcoholic hydroxyl groups furnished by said alcohol to chloride atoms furnished by said vinyltrichlorosilane being greater than 1.3:1 but not greater than 2:1, said product being a free-flowing liquid at ambient temperatures.

References Cited in the file of this patent

UNITED STATES PATENTS

| | | |
|---|---|---|
| 2,441,066 | Hanford | May 4, 1948 |
| 2,584,351 | Hunter et al. | Feb. 5, 1952 |